United States Patent [19]

Anderka et al.

[11] 4,188,634
[45] Feb. 12, 1980

[54] METHOD FOR REGULATING INK FLOW IN DRAFTING PENS

[75] Inventors: Gerold Anderka, Ellerbek; Walter Jozat, Bad Bramdstedt, both of Fed. Rep. of Germany

[73] Assignee: Koh-I-Noor Rapidograph, Inc., Bloomsbury, N.J.

[21] Appl. No.: 907,536

[22] Filed: May 19, 1978

[30] Foreign Application Priority Data

Sep. 14, 1977 [DE] Fed. Rep. of Germany ....... 2741311

[51] Int. Cl.² .......................................... G01D 18/00
[52] U.S. Cl. ...................................... 346/1.1; 73/295; 137/392; 346/140 R
[58] Field of Search ................. 346/140 R, 1; 73/295; 137/392

[56] References Cited

U.S. PATENT DOCUMENTS

| | | | |
|---|---|---|---|
| 1,849,084 | 3/1932 | Hand | 346/140 R X |
| 2,157,549 | 5/1939 | Lindenblad | 346/140 R X |
| 3,096,742 | 7/1963 | Gill | 346/140 R |
| 3,185,998 | 5/1965 | Bussey | 346/140 R |
| 3,334,285 | 8/1967 | Blake | 318/331 |
| 3,348,235 | 10/1967 | Kawase | 346/140 |
| 3,401,401 | 9/1968 | Read | 346/140 R X |
| 3,437,107 | 4/1969 | Waseleski | 137/392 |
| 3,522,607 | 8/1970 | Felton | 346/140 R |
| 3,835,881 | 9/1974 | Dal | 137/392 |
| 3,890,896 | 6/1975 | Zimmer | 101/366 X |
| 3,909,831 | 9/1975 | Marchio | 346/140 |
| 3,950,762 | 4/1976 | Anderka | 346/140 R |
| 4,054,883 | 10/1977 | Ozone | 346/140 R |
| 4,097,874 | 6/1978 | Anderka | 346/140 R |

FOREIGN PATENT DOCUMENTS

2235737 8/1973 Fed. Rep. of Germany .
2429225 1/1975 Fed. Rep. of Germany .
2522012 11/1976 Fed. Rep. of Germany .

*Primary Examiner*—Joseph W. Hartary
*Attorney, Agent, or Firm*—David H. Semmes; Warren E. Olsen

[57] ABSTRACT

Method of regulating ink flow in automatic drafting pens of the type supporting a plurality of stylographic pens in parallel, including pumping ink from a reservoir into the writing pen capillary tubes, gauging the level of ink intermediate the reservoir and the capillary tubes and modifying said pumping as the gauged, actual level of ink flow may deviate from a desired level of ink flow. The method includes buffering of ink flow into the capillary tubes, so as to overcome the effects of inertia (when the pen is not writing), as well as the surge of ink flow under pumping pressure.

8 Claims, 3 Drawing Figures

METHOD FOR REGULATING INK FLOW IN DRAFTING PENS

BACKGROUND OF THE INVENTION

(1) Field of the Invention

Automatic drafting instruments of the type supporting in parallel a plurality of stylographic pens, each pen having a capillary writing tip. Particularly, a method and apparatus for constantly feeding ink to the several pens so that uniformly wide and full lines are drawn, while eliminating oversupply of ink which results in the formation of a writing fluid drops, at the tip of each pen.

(2) Description of the Prior Art

West German Patent Publication No. 24 29 225
West German Patent Publication No. 25 22 012

The invention concerns a method for regulating ink flow in drafting pens, especially automatic drafting pens having a cylindrical body with capillary writing tube or tip supported in the forward end of the cylinder. Several such tubular pens may be connected in parallel with a feeding or pumping device for writing fluid. Pumping is controlled by comparing actual ink flow with desired ink flow.

In the case of a known process of this kind, using a single tubular pen (West German Patent Publication No. 22 35 737 or U.S. Pat. No. 3,781,907), the speed of writing with the tubular pen is determined in relation to the drawing base and from this speed of writing an actual value is derived which is supplied to a feeding or pumping device for ink or writing fluid. The feeding device includes a pump which controls the actual value of the amount of writing fluid being fed to the tubular pen. In this manner the tubular pen emits just that portion of writing fluid at any speed during the drawing or writing such that uniformly wide and full lines are drawn. This process involves the difficulty of cutting off without delay the writing fluid supply to the tubular pen as drawing is completed and the tubular pen is lifted off the drawing base. The entire holding device carrying the tubular pen continues to move, of course, after removing the pen from the drawing base, so that a writing speed is thus determinable and an actual value is indicated whereby writing fluid is supplied to the moving tubular pen. Conventionally, this additional supply of ink results in the formation of a writing fluid drop at the writing tip of the tubular pen, so that when the tubular pen is reused a spot forms or a drawn line is enlarged.

In order to avoid these difficulties, it is also already known to measure as actual value the writing fluid pressure occurring in the are of the front end of the tubular pen when drawing with a single tubular pen (German Patent Publication No. 24 29 115, or U.S. Pat. No. 3,950,762) or when drawing with several tubular pens connected in parallel to the feeding device for writing fluid (German Patent Publication No. 25 22 012, or U.S. Pat No. 3,950,762. In this manner, the amount of writing fluid actually being used during the drawing process is determined and, by comparing the actual value with a desired value corresponding to the pressure of the writing fluid in the front area of the end of the tubular pen or tubular pens which is required for a uniform drawing, the supply of the writing fluid to the tubular pen or pens can be controlled in such a manner that the actual value is again and again and practically without delay adapted to the desired value.

Furthermore, the continued movement of the drawing instrument, when the tubular pen is lifted off of the drawing base, has no influence on the supply of the writing fluid because, as soon as writing fluid is no longer being used, the pressure of the writing fluid is automatically adjusted to the desired value, i.e. the value required for optimum drawing purposes. Thus, in the case of this known process, the desired value is that pressure in the writing tip of the tubular pen which is required to permit a uniform flow of writing fluid from the writing tube without formation of spots. When this desired value of writing fluid pressure is maintained, the desired drawing result is obtained, independently of the speed with which the tubular pen is moved relative to the drawing base.

In this way, it is possible, with conventional processes, to vary the drawing speed up to comparatively high values; however, this conventional process requires measuring and evaluation of very small changes in pressure in the magnitude of of fractions or a miniscule number of millimeters of water in a column, so that a very sensitive pressure receiver must be installed in the front area of the tubular pen which must, additionally, interact with a sensitive comparator system for the comparison of desired value and actual value, as well as a sensitive feeding or pumping device for the writing fluid.

SUMMARY OF THE INVENTION

It is, therefore, the objective of the invention to create a drawing instrument which eliminates the necessity for measuring pressure and which, at comparatively low cost, provides for drawing of uniformly wide and fully covering lines at high drawing speeds. In order to achieve this task, the tubular pens are provided with an intermediate writing fluid chamber which is in direct connection with ambient air and the writing fluid level in this chamber is measured as the actual value. Thus, a given writing fluid level and, therefore, a given static writing fluid pressure are simply maintained in the tubular pen or pens. As a result, the amount of writing fluid leaving the writing tube during the drawing process is kept at a constant rate which means that, with a given drawing speed, always a uniformly wide and fully covering line is drawn. The formation of spots or an enlargement of the lines owing due to a too high supply of writing fluid to the writing tube is avoided. Also, irregular widths of lines and not fully covering lines due to a too low supply of writing fluid to the writing tube are avoided. This method enables work with maximum drawing speed at the desired value of feeding, because the actual value, i.e. the level of the writing fluid, cannot be drastically lowered. This actual drawing speed is indicated by this fluid level in the chamber on the one hand, and by the capillary behavior of the tubular pen on the other hand.

Furthermore, the present invention concerns a regulating and control system for the feeding of writing fluid to an automatic drafting instrument; especially, the feeding of fluid to a tubular pen which has a writing tube supported in the front part of a cylindrical body and a writing fluid chamber or reservoir in direct contact with ambient air. Several such tubular pens may be connected with a feeding or pumping device for writing fluid which is coupled with a measuring arrangement for the actual value of feeding whereby the actual value of feeding is comparable with the desired value of feeding.

In the present invention, this regulating and control system is characterized by the fact that the measuring arrangement for the actual value consists of a liquid level indicator in a tubular pen or an open intermediate chamber between the writing pen tip and a feeding device for the writing fluid. This liquid level indicator is connected with a comparator system, which, in its turn, is connected with the feeding device for the writing fluid, for the comparison of the output signal of the liquid level indicator, indicating actual value, with a predetermined, signal indicating the desired value.

DESCRIPTION OF THE PREFERRED EMBODIMENTS

Figure 1:
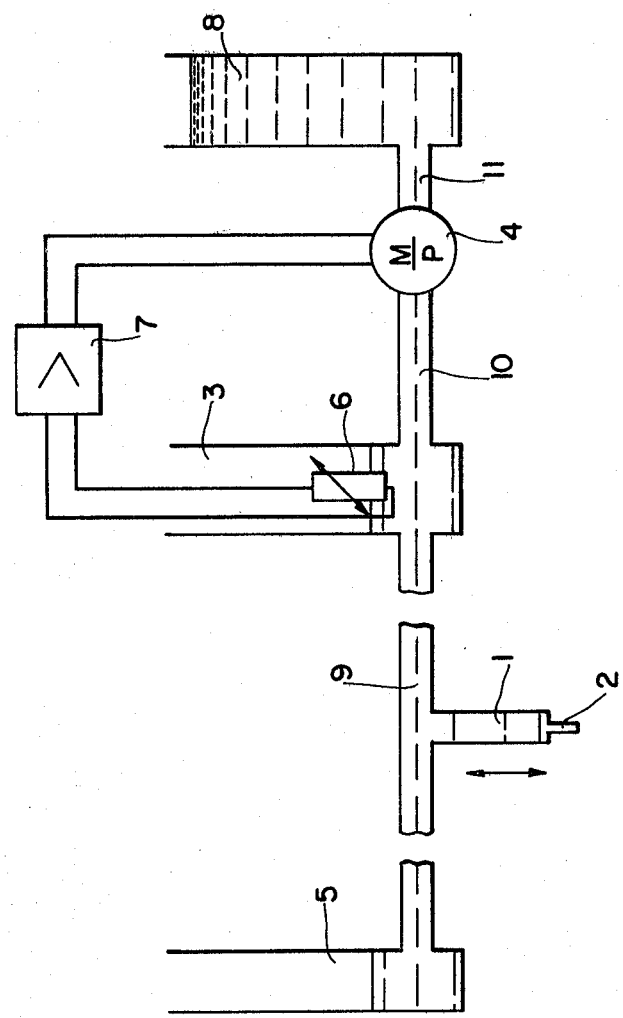
FIG. 1 is a schematic representation of a tubular pen with a regulating and control system, according to the present method.

The schematically represented tubular pen 1 in FIG. 1 has a writing tube 2 and can, as indicated by the arrows, be actuated vertically so that its writing tube can be put into contact with the drawing base by lowering it and the tubular pen can be moved into a resting position by lifting it. A conduit 9 is connected to tubular pen 1 which, thus, communicates with an open intermediate chamber 3, being in contact with the ambient air. Conduit 10 and pump 4, having a driving motor (not illustrated) interconnect intermediate chamber 3 and the ink or writing fluid reservoir 8. Intermediate chamber 3 does not have any ink equalization chamber. When activated, pump 4 supplies writing fluid from writing fluid reservoir 8 through a supply conduit 11 into conduit 10, intermediate container 3 and conduit 9.

Within intermediate container 3, there is mounted a hot conductor 6 which is connected with a threshold value amplifier 7. Hot conductor 6 is heated by a continuous flow of current, so that it has a given temperature when it is not in contact with writing fluid. However, when hot conductor 6 gets into contact with writing fluid, i.e. when the liquid level is raised to a certain level in the intermediate chamber 3, due to operation of pump 4, hot conductor 6 cools down and its resistance is increased. The thus effected lowering of the magnitude of the current flowing through hot conductor 6 affects threshold value amplifier 7 which, with the actual current value falling below a given value, interrupts the output of an actuation signal to pump 4. Pump 4 is cut off with the result that no more writing fluid is then pumped into intermediate chamber 3 in which the desired liquid level has been reached.

When the liquid level is lowered in the intermediate chamber 3 due to the consumption of writing fluid or its evaporation, hot conductor 6 is reheated and its resistance is lowered, so that a larger amount of current flows through it. When this current reaches a given magnitude, the threshold value of amplifier 7 is exceeded and an activation signal is supplied to pump 4 which then supplies writing fluid in the above described manner in order to bring the liquid level in the intermediate container 3 to the desired value. In order to avoid too high a liquid pressure acting upon the tubular pen or the supply of too much writing fluid when, for example, writing fluid still flows through the line 9 due to inertia after the movement of the drawing head across the drawing base has been stopped, a buffer container 5 with open top is provided at the end of conduit 9. Buffer container 5 serves the purpose of an additional receiver for writing fluid. It should be pointed out that several tubular pens can be connected to conduit 9.

Figure 2:
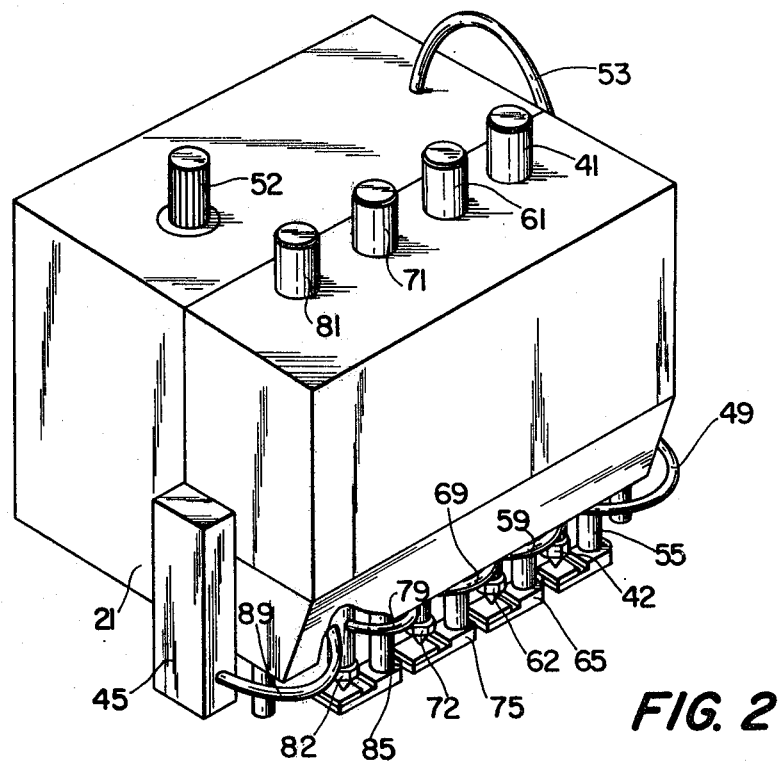
FIG. 2 is a perspective of a drawing head designed according to the invention.
Figure 3:
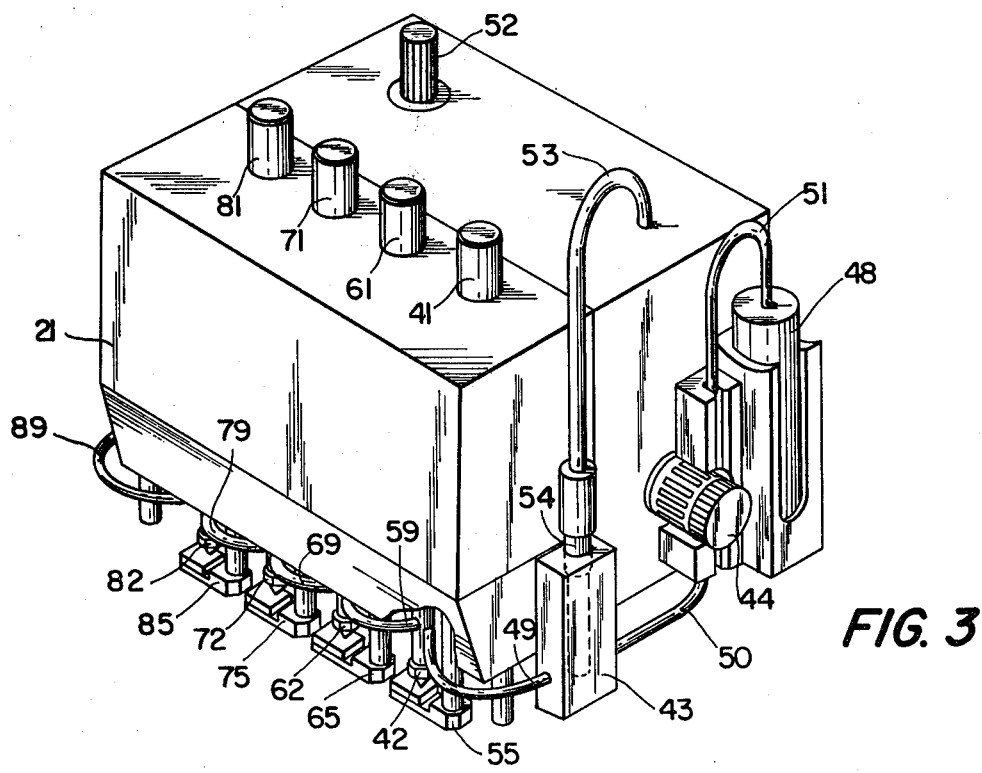
FIG. 3 is another perspective of the drawing head.

In an automatic drafting instrument writing head 21, which is perspectively shown in FIGS. 2 and 3, four tubular pens 41, 61, 71, 81 are provided with writing tubes 42, 62, 72, 82, with the latter being sealed off by means of horizontal sealing elements 55, 65, 75, 85 which can be swung or pivoted away. In order to bring the writing tube of a tubular pen into contact with the drawing base, the respective sealing element is pivoted or swung away and the tubular pen is lowered. Lateral to the drawing head, an ink container 48 is fastened which is connected, through a conduit 51, with a pump 44 from which conduit 50 leads into an intermediate chamber 43. This intermediate chamber has, in its upper area, an oening which supports a compression spring 54 pushing upward a bracket 53 which can be lowered. Bracket 53 can be lowered against the pressure of the spring 54 in order to seal off the intermediate container 43, as explained below. Conduit 49 leads from intermediate container 43 to tubular pen 41 and tubular pen 41 is connected with the tubular pen 61 through conduit 59, tubular pen 61 with the tubular pen 71 through conduit 69 and tubular pen 71 with tubular pen 81 through conduit 79. Conduit 89 leads from the tubular pen 81 to a buffer chamber 45 having an open top and being fastened at the outside of the drawing head 21.

As illustrated in FIGS. 1 and 3, hot conductor 6, utilized for the measuring of the liquid level, is arranged in the intermediate chamber 43 as a tube extending from the opening or from the spring 54 towards the bottom; the lower part of this tube is open so that writing fluid can enter into the tube. The mode of operation and functioning of this hot conductor corresponds to that of the hot conductor of FIG. 1.

In order to put the tubular pen into operation, bracket 53 is first pushed downwardly and thus the intermediate chamber 43 is sealed off. Now, writing fluid is supplied by pump 44 which enters into the tubular pens through conduit 50, intermediate chamber 43 and conduit 49, as well as the different connecting conduits between the tubular pens. By entering into the tubular pens the transported writing fluid pushes ahead of it the air through the tubular pens and into the buffer container 45 through the conduit 89. When air is pushed out of the tubular pens, the opening in the intermediate container 43 is opened by releasing the bracket 53 and the liquid level is kept constant or adjusted in the intermediate container 43, and thus the liquid levels in the tubular pens connected with each other are kept constant, in a manner as described in connection with FIG. 1.

In order to remove again the writing fluid from all tubular pens, for example, for maintenance and cleaning purposes of the writing head, bracket 53 is again pushed down against the power of the spring 54 and the intermediate container 53 is thusly sealed off. Now pump 44 is operated reversely and in the opposite direction, so that the pump sucks the writing fluid out of the tubular pens back into the container 48.

Program selection switch 52 serves the purpose of switching on the different working and operating conditions which, however, is not of paramount importance to the invention.

We claim:

1. Method for regulating ink flow in drafting pens of the type having a tubular writing pen which is communicant with an open ended main reservoir, at one end, and communicant with the tip of a capillary writing tube at its other end, comprising the steps of:
   A. Pumping ink from said reservoir into the tubular pen and towards the writing tip of said tube;
   B. Buffering ink flow from said reservoir into said tubular pen by defining an open-ended ink buffer chamber which is in ink communication with the reservoir and the writing tip;
   C. Gauging the level of ink intermediate said main reservoir and said writing tip by monitoring the ink level in an open-ended intermediate reservoir which is between said writing tip and said main reservoir; and
   D. Modifying pumping as the gauged, actual level of ink within said intermediate reservoir deviates from a desired level.

2. Method for regulating ink flow in drafting pens as in claim 1, wherein said gauging step comprises immersing an electrical resistance within the ink in said intermediate reservoir including:
   (E) developing an actual level signal through said electrical resistance;
   (F) amplifying said signal; and
   (G) comparing said actual level signal with a desired level threshold, while modifying pumping, accordingly.

3. Method for regulating ink flow in drafting pens as in claim 2, wherein said resistance increases in temperature, as the actual level falls and decreases in temperature, as the actual level rises.

4. Method for regulating ink flow in drafting pens as in claim 3, wherein said desired level threshold is equated to immersing of said resistance within said ink flow.

5. Method for regulating ink flow in drafting pens as in claim 1, including initially pumping prior to gauging, so as to drive air through the capillary tube writing tip.

6. Method for regulating ink flow in drafting pens as in claim 5, including reverse pumping, so as to remove ink from said capillary tube writing tip.

7. Method for regulating ink flow in drafting pens as in claim 1, wherein a plurality of tubular pens are mounted in parallel between said intermediate chamber and said buffer chamber.

8. Method for regulating ink flow in drafting pens as in claim 1, wherein said gauging is via immersing an electrical resistance within said ink and, further including:
   E. Cutting off said pumping as actual ink level reaches said desired level and recommencing said pumping, as actual level falls below said desired level.

* * * * *